United States Patent
Ramsden

(10) Patent No.: US 9,535,177 B2
(45) Date of Patent: Jan. 3, 2017

(54) GAMMA-RAY SPECTROMETRY

(71) Applicant: Symetrica Limited, Southhampton Hampshire (GB)

(72) Inventor: David Ramsden, Southhampton (GB)

(73) Assignee: Symetrica Limited (GB)

( * ) Notice: Subject to any disclaimer, the term of this patent is extended or adjusted under 35 U.S.C. 154(b) by 0 days.

(21) Appl. No.: 14/417,552

(22) PCT Filed: Jun. 20, 2013

(86) PCT No.: PCT/GB2013/051611
§ 371 (c)(1),
(2) Date: Jan. 26, 2015

(87) PCT Pub. No.: WO2014/016550
PCT Pub. Date: Jan. 30, 2014

(65) Prior Publication Data
US 2015/0316665 A1    Nov. 5, 2015

(30) Foreign Application Priority Data

Jul. 27, 2012 (GB) .................................. 1213374.0

(51) Int. Cl.
*G01T 1/00* (2006.01)
*G01T 7/00* (2006.01)
(Continued)

(52) U.S. Cl.
CPC .............. *G01T 7/005* (2013.01); *G01T 1/203* (2013.01); *G01T 1/247* (2013.01); *G01T 1/366* (2013.01); *G01T 1/40* (2013.01)

(58) Field of Classification Search
CPC .......... G01T 1/203; G01T 1/247; G01T 1/366; G01T 1/40; G01T 7/005; G01T 1/362
(Continued)

(56) References Cited

U.S. PATENT DOCUMENTS 3,296,438 A * 1/1967 Main .................... G01T 1/40
                                                                     250/252.1
4,053,767 A    10/1977 Kampfer et al.
(Continued)

FOREIGN PATENT DOCUMENTS

| GB | 2463707 A | 3/2010 |
| SU | 776272 A1 | 6/1982 |
| WO | WO 2010/034962 A2 | 4/2010 |

OTHER PUBLICATIONS

J.M. Poulsen et al.; IBIS Calibration Unit on Integral Satellite; Proceedings of the 4th Integral Workshop Exploring the Gamma-Ray Universe; Sep. 4-8, 2000; Alicante, Spain.
(Continued)

*Primary Examiner* — David J Makiya
*Assistant Examiner* — Taeho Jo
(74) *Attorney, Agent, or Firm* — Fitzsimmons IP Law

(57) ABSTRACT

A calibration source for a gamma-ray spectrometer is provided, comprising a scintillator body having a cavity in which a radioactive material is received. A scintillator body may be cuboid and the cavity may be a hole drilled into the scintillator body. The radioactive material comprises an isotope having a decay transition associated with emission of a radiation particle and a gamma-ray of known energy. A photodetector is optically coupled to the scintillator body and arranged to detect scintillation photons generated when radiation particles emitted from the radioactive material interact with the surrounding scintillator. A gating circuit is arranged to receive detection signals to generate corresponding gating signals for a data acquisition circuit of an associated gamma-ray spectrometer to indicate that gamma-ray detections in the gamma-ray spectrometer occurring within a time window defined by the gating signal are associated with a decay transition in the radioactive isotope.

21 Claims, 3 Drawing Sheets

(51) Int. Cl.
*G01T 1/24* (2006.01)
*G01T 1/203* (2006.01)
*G01T 1/36* (2006.01)
*G01T 1/40* (2006.01)

(58) Field of Classification Search
USPC .................................................. 250/207
See application file for complete search history.

(56) References Cited

U.S. PATENT DOCUMENTS

| | | | | |
|---|---|---|---|---|
| 4,085,323 | A * | 4/1978 | Turcotte | G01V 13/00 250/252.1 |
| 4,450,354 | A | 5/1984 | Smith, Jr. et al. | |
| 5,422,480 | A | 6/1995 | Schultz | |
| 6,064,068 | A | 5/2000 | Bartle | |
| 6,275,563 | B1 * | 8/2001 | Griffin, Jr. | G01N 23/06 378/58 |
| 8,330,115 | B2 * | 12/2012 | Frank | G01T 3/06 250/336.1 |
| 8,466,426 | B2 * | 6/2013 | Frank | G01T 3/00 250/390.11 |
| 2006/0027754 | A1 * | 2/2006 | Ramsden | G01T 1/20 250/361 R |
| 2007/0085014 | A1 * | 4/2007 | McIntyre | G01T 1/172 250/367 |
| 2007/0237668 | A1 * | 10/2007 | Martins Loureiro | B82Y 30/00 419/48 |
| 2009/0166542 | A1 * | 7/2009 | Ruan | G01T 1/362 250/369 |
| 2010/0121811 | A1 * | 5/2010 | Ramsden | G01T 1/1642 706/54 |
| 2011/0024635 | A1 * | 2/2011 | Shah | G01T 1/202 250/362 |
| 2011/0211675 | A1 * | 9/2011 | Ramsden | G01T 1/40 378/82 |
| 2013/0163707 | A1 * | 6/2013 | Habs | G21G 1/12 376/157 |
| 2013/0173220 | A1 * | 7/2013 | Bronson | G06F 17/00 702/189 |
| 2014/0209808 | A1 * | 7/2014 | De Volpi | G01T 3/06 250/368 |
| 2014/0299757 | A1 * | 10/2014 | Akers | G01T 1/167 250/269.1 |

OTHER PUBLICATIONS

D.J. Forrest; The Gamma Ray Spectrometer for the Solar Maximum Mission; Solar Physics 65; 1980; pp. 15-23; D. Reidel Publishing Co.; Boston, U.S.A.

Yu. S. Popov et al.; Measuring Low Activities of Fission-Product Xenon Isotopes Using the Beta-Gamma Coincidence Method; Physical Instruments for Ecology, Medicine, and Biology; Instrument and Experimental Techniques, vol. 48, No. 3; 2005; pp. 380-386; Pleiades Publshing, Inc.; St. Petersburg, Russia.

* cited by examiner

GAMMA-RAY SPECTROMETRY

BACKGROUND ART

The invention relates to gamma-ray spectrometry, and in particular to calibration sources for gamma-ray spectrometers and gamma-ray spectrometers having calibration sources.

Gamma-ray spectrometers are used in a wide variety of applications, for example to identify and monitor gamma-ray sources in scientific, industrial, and environmental monitoring applications, e.g. for security screening of personnel and cargo at border crossings, or to search generally for orphaned radioactive sources. A common class of gamma-ray spectrometers is based on organic (plastic) or inorganic (crystal) scintillator materials.

FIG. 1 shows an example of a conventional crystal scintillation spectrometer 2. The spectrometer is generally axially symmetric with a diameter of around 8 cm and a length of around 8 cm. The spectrometer 2 comprises a scintillation crystal 4 which scintillates when a gamma-ray is absorbed within it. A common scintillation crystal material is thallium doped sodium iodide (NaI(Tl)). There are, however, various other scintillator crystals, and also scintillator plastics, that may be used.

The scintillation crystal 4 is hermetically sealed within a thin aluminium body 6 with $Al_2O_3$ powder packing arranged around the crystal 4 to act as a reflective material. Gamma-rays from a source enter the spectrometer through the aluminium enclosure. Gamma-rays interact with the scintillation crystal 4 in scintillation events in which lower-energy photons are generated, e.g. optical photons. The scintillation crystal 4 is optically coupled to a photomultiplier tube (PMT) 10 on a side opposite a front face 8 of the aluminium housing 6. The PMT 10 is for detecting photons generated in the scintillation crystal 4 in gamma-ray detection events. Thus the PMT 10 is operable to output a signal indicative S of the intensity of the scintillation flash generated in the crystal 6 in response to each gamma-ray interaction. The intensity of the flash depends on the amount of the energy of the incident gamma-ray deposited in the crystal.

Output signals S from the PMT 10 are routed to a spectrum analyser 12, e.g. a multi-channel analyser. The amplitudes of the respective output signals S are indicative of the energy of the corresponding incident gamma-rays deposited in the crystal. The relationship between an energy deposit D in the scintillation body 4 and an resulting output signal S is defined by a response function of the spectrometer.

The spectrum analyser 12 is operable to process the output signals received from the PMT in a given integration time (or in an accumulating manner) and to generate an energy loss spectrum for the corresponding detection events. This requires the spectrum analyser 12 to convert the measured output signals S to estimates of the energy deposited D in the gamma-ray detector in the corresponding events. The mapping from output signals S to energy deposit D is defined by a calibration function. The calibration function is selected to provide an inverse to the response function for the spectrometer. That is to say, if an energy deposit $D_0$ in a crystal is converted to an output signal $S_0$ in accordance with the spectrometer's response function, the aim of the calibration function is to invert the spectrometer's response so as to convert the output signal $S_0$ back to an estimate of the energy deposit $D_0$.

The general principles underlying the application of calibration functions to in effect undo a gamma-ray spectrometer's response function are well known. The calibration function may, for example, be based on a look-up table, or a functional relationship that provides for a conversion of an observed signal amplitude S to an estimated energy deposit D. The calibration function may be based on empirical observations of calibration sources having known spectra, or theoretical predictions.

By way of an example of a spectrometer's response to an energy deposit, an energy loss of 1 MeV in a NaI(Tl) scintillator crystal such as shown in FIG. 1 might generate around $n_\gamma$=38,000 photons. The $Al_2O_3$ powder surrounding the scintillator crystal provides for relatively high diffuse reflectance, typically providing a transfer efficiency T such that that perhaps 85% or so of generated photons are transferred to the photo-cathode of the PMT 10. The quantum-efficiency QE of a PMT at the wavelength of interest is typically around 25%. Thus the number of charge-carriers $N^{cc}$ released from the photo-cathode of the PMT in response to the 1 MeV energy deposit will be around 8,000 (i.e. $n_\gamma * T * QE$, where $n_\gamma$=38,000, T=0.85, and QE=0.25). The output signal S from the PMT will thus be $8000 G_0$ (in arbitrary units), where $G_0$ is a measure of the gain of the PMT. Thus the calibration function here should ideally be defined such that an output signal of $8000 G_0$ is mapped back to an energy loss of 1 MeV.

As noted above, the general principles underlying the application of calibration functions to gamma-ray spectrometer data are well understood. For example it is known that a spectrometer response function in many scintillation crystals will generally be non-linear (i.e. a twice-as-high energy deposit D in the scintillation crystal will not in general correspond with a twice-as-high output signal S from the PMT). Some aspects of an arbitrary spectrometer response function are represented in Table 1. It will be appreciated, however, that this is purely a simple example for the purposes of explanation, it is not intended to reflect the true response characteristics of any particular scintillation spectrometer.

TABLE 1

| Energy deposit D (MeV) | PMT Output signal S (arbitrary units) |
|---|---|
| 0.7 | 6230 * $G_0$ |
| 0.8 | 6880 * $G_0$ |
| 0.9 | 7470 * $G_0$ |
| 1.0 | 8000 * $G_0$ |
| 1.1 | 8470 * $G_0$ |
| 1.2 | 8880 * $G_0$ |
| 1.3 | 9230 * $G_0$ |

The PMT output signals S shown in Table 1 is the product of two basic parameters, namely the number of charge carriers $N^{cc}$ generated at the photo-cathode of the PMT (e.g. 8000 at 1 MeV), and the gain of the PMT ($G_0$). As noted above, the spectrum analyser component of the gamma-ray spectrometer is operable to convert an observed PMT output signal S to an estimated energy deposit D in the crystal. This could be done by reference to a look-up table such as represented in Table 1, but more likely will be done by applying a functional parameterisation of the calibration. For example, the spectrometer response function represented in Table 1 may be parameterised as $$S = (11000 * D - 3000 * D^2) * G_0 \qquad \text{(Equation 1)}.$$

This equation may be solved for a given observed output signal S to provide an estimate of energy loss D.

A problem with scintillator-based gamma-ray spectrometers is that the number of charge carriers $N^{cc}$ generated at the photo-cathode of a PMT for a given gamma-ray energy deposit in a given spectrometer is not necessarily constant. For example, the number of charge carriers $N^{cc}$ depends relatively strongly on the temperature of the spectrometer (primarily because the number of photons $n_\gamma$ generated in the energy deposit depends on the temperature of the scintillation crystal). This means the spectrometer's response function can vary with changing conditions. As such any assumed calibration function for converting from output signal S to incident energy deposit D will only be correct for some conditions (i.e. the conditions for which the calibration function was originally determined). This is problematic because a failure to properly map output signals S back to energy deposits D will lead to a poorly calibrated spectrum, e.g. with peaks appearing at the wrong energies. The problem of a spectrometer's response changing according to different conditions arises to some extent in all gamma-ray spectrometers, and not just in scintillator-based spectrometers.

A known way of dealing with this problem is to adjust the gain of the acquisition system (e.g. of the PMT itself, or of an associated signal amplifier). This is generally known as stabilization.

Stabilization may, for example, be achieved by adjusting system gain in response to measured changes in environmental conditions so as to compensate for corresponding changes in the spectrometer's response. For example, suppose the response function represented in Table 1 was applicable for a spectrometer at 20° C., and there was known to be a 1% drop in $N^{cc}$ for each 1° C. rise in temperature. This means at a temperature of 30° C., an energy deposit of 1 MeV would generate only around 7200 charge carriers (as opposed 8000 at 20° C.), and hence an output signal of $S=7200*G_0$ would be seen. If no account were taken of the change in environmental conditions, this output signal would be mapped back to an estimated energy deposit of between 0.8 and 0.9 MeV, and so result in an inaccurate energy-loss spectrum. Thus it is known to monitor the temperature of a spectrometer and to compensate for changes in the number of charge carriers generated for a given energy deposit by applying a corrective temperature-dependent calibration factor f to the PMT gain. For example, if the temperature changed by an amount known to cause a 10% fall in charge carriers, the PMT gain could be increased by 11% to compensate. Thus for the 30° C. example give above, the output signal would become $S=N^{cc}*f*G_0=7200*1.11*G_0=8000\ G_0$. This would then be correctly mapped back to an energy deposit of 1 MeV by reference to the calibration function represented in Table 1. A problem with this approach is that it is difficult to monitor changes in environmental conditions, and to model their impact on a spectrometer's response, with high accuracy.

Another approach for providing stabilization is based on monitoring the response of a spectrometer to a source of calibration gamma-rays of known energy(ies). A calibration factor f may then be applied to the PMT gain (or other data acquisition system gain), where f is selected such that output signals associated with calibration gamma-rays are correctly mapped back to the known energy of these calibration events. For example, a servo loop may be provided with the system gain being adjusted in response to apparent differences between the known energies for calibration events and the energies determined from their output signals S via the assumed calibration function. An advantage of this approach is that all changes in the spectrometer's response function can be accounted for simultaneously regardless of cause. However the approach must be performed separately from data acquisition from a target of interest, or requires a technique for distinguishing calibration events from "real" events so that the calibration events do not contaminate the energy loss spectrum determined for the real events.

Previously proposed schemes for calibration-source-based stabilization have employed calibration isotopes (e.g. Co-60, Cs-137 or Na-22) to dope a small plastic secondary scintillation detector viewed by a separate PMT to provide an electronic gating signal each time that a beta-particle is detected in the plastic [1, 2]. Gamma-rays detected in a main detector at the same time as a beta-detection event in the secondary detector are taken to be associated with the calibration source, and hence of a known energy. These can be processed separately from other events and used to provide spectral stabilization. In typical applications, the size of this uniformly doped plastic scintillator is chosen such that the probability of the beta-particle escaping from the calibration source without depositing sufficient energy can be sufficiently small in order to avoid generating untagged calibration events. This approach can result in relatively bulky spectrometers and is not practical for use in all situations, e.g. for use in compact hand-held gamma-ray spectrometers. Furthermore, there can be practical difficulties in manufacturing suitably doped scintillator material, for example, because of a risk of radioactive contamination of a manufacturing plant devoted to the production of scintillation materials.

Another previously proposed scheme has used Na-22 as a calibration source between a primary spectrometer and a secondary gamma-ray detector. The approach relies on the fact that Na-22 emits a positron which promptly annihilates to produce a pair of 511 keV photons propagating in opposite directions. If one of the annihilation gamma-rays is detected in the secondary gamma-ray detector, this can be used to provides an electronic signal that can be used to label simultaneous events in the primary spectrometer as being associated with the Na-22 calibration source [3]. This again allows the calibration events to be separated from "real" events. The system gain can then be adjusted so the energies for the Na-22 emissions determined using the primary spectrometer match the known emission energies for this isotope, thereby simultaneously stabilizing the observed spectrum for the real events.

Another technique widely used in stabilizing the gain of gamma-ray spectrometers is based on the incorporation of a weak alpha-emitting source, e.g. Am-241, into the scintillation crystal assembly. The alpha-particles from the Am-241 then generate a large energy-deposit in the crystal which is beyond the energy-range of interest of most gamma-ray spectrometers (~4 MeV). A servo-loop may then be set to maintain this peak at a constant position in the spectrum as temperature, and other environmental conditions, change. This helps ensure the gamma-ray spectrum recorded at the same time is stabilized. However, in addition to emitting 4 MeV alpha particles, Am-241 also emits 59 keV gamma-ray emission. There is no way of identifying these events in an observed spectrum to separate them from "real" events in this energy region, that is to say, the calibration source contaminates the observed spectrum. This makes the approach unsuitable for many isotope identification systems which need to be able to reliably identify isotopes having emission lines in this energy region, including Am-241 itself.

Still another technique for stabilizing the gain of gamma ray spectrometers is described in WO 2010/034962 A2 [4].

This approach is based on the use of a calibration source which comprises a radioactive material comprising a radioactive isotope having a decay transition associated with emission of a radiation particle and a gamma-ray having a known energy and a solid-state detector arranged to receive radiation particles emitted from the radioactive material. A gating circuit is coupled to the solid-state detector and is operable to generate a gating signal in response to detection of a radiation particle in the solid-state detector. The gating signal may thus be used as an indicator that an energy deposit in a nearby gamma-ray spectrometer is associated with a decay transition in the radioactive isotope. Whilst devices of the kind described in WO 2010/034962 A2 have been found to perform well and provide for good calibration, they are in some respects relatively complicated devices, for example relying on the availability of specialist solid-state detectors, and as a consequence they can be relatively expensive.

There is therefore a need for alternate calibration sources for use with gamma-ray spectrometers.

SUMMARY OF THE INVENTION

According to a first aspect of the invention there is provided a calibration source for a gamma-ray spectrometer, the calibration source comprising: a small scintillator body having a cavity in which a radioactive material is received, the radioactive material comprising a radioactive isotope having a decay transition associated with emission of a radiation particle and a gamma-ray having a known energy; a photodetector optically coupled to the scintillator body and arranged to detect scintillation photons associated with radiation particles emitted from the radioactive material within the cavity of the scintillator body interacting with the scintillator body and to output corresponding detection signals; and a gating circuit arranged to receive the detection signals from the photodetector and to generate a corresponding gating signal and to output the gating signal for receipt by a data acquisition circuit of a gamma-ray spectrometer to indicate that gamma-ray detection in the gamma-ray spectrometer occurring within a time window defined by the gating signal is associated with a decay transition in the radioactive isotope.

Thus a compact and easy to manufacture calibration source for tagging gamma-ray emission as an indicator of their being associated with calibration events may be provided. The calibration source may be used in conjunction with a gamma-ray spectrometer to help stabilize the spectrometer's response by allowing comparison of a derived spectrum of the calibration events (i.e. events indicated as being associated with a decay transition in the radioactive isotope) with the known energy/possible energies of these events. A calibration spectrum can thus be provided continuously and in quasi-real time for use in a gain-stabilization system for the spectrometer with relatively little contamination of a spectrum being observed.

In accordance with some embodiments the photodetector is a solid-state (semiconductor) detector.

In accordance with some embodiments the photodetector is a silicon-based detector.

In accordance with some embodiments the photodetector is a silicon photomultiplier.

In accordance with some embodiments the photodetector is a P-Intrinsic-N (PIN) diode-based detector In accordance with some embodiments the scintillator body comprises a plastic scintillator material.

In accordance with some embodiments the radioactive material is located in the cavity in the vicinity of a centre of the scintillator body.

In accordance with some embodiments the cavity extends inwardly from a surface of the scintillator body, for example formed by drilling.

In accordance with some embodiments the cavity is back-filled once the radioactive material is received in the cavity so as to contain the radioactive material within the cavity.

In accordance with some embodiments the radioactive material is located in the cavity such that the surrounding scintillator body subtends a solid angle of at least a fraction selected from the group comprising 0.5, 0.6, 0.7, 0.8, 0.9 and 0.95 of a closed surface.

In accordance with some embodiments the scintillator body has a similar characteristic extent in three orthogonal directions.

In accordance with some embodiments the similar characteristic extent in three orthogonal directions is selected from the group comprising 5 mm, 6 mm, 7 mm, 8 mm, 9 mm, 10 mm, 15 mm, 20 mm and 25 mm. More generally, the similar characteristic extent in three orthogonal directions may be less than or equal to 5 mm, 6 mm, 7 mm, 8 mm, 9 mm, 10 mm, 15 mm, 20 mm and 25 mm.

In accordance with some embodiments the scintillator body is generally cuboid.

The radiation particle may be a beta particle, for example a beta-plus particle (positron). A positron has the advantage of further producing two 511 keV annihilation gamma-rays which may also be detected by an associated gamma-ray spectrometer and used as calibration points for monitoring the spectrometer's response. In principle the radiation particle could equally be an alpha particle.

The radioactive material, e.g. Na-22, may have a radioactivity level in a range selected from the group comprising 10 Bq to 500 Bq, 50 Bq to 300 Bq, and 75 Bq to 150 Bq. In many circumstances this will provide a reasonable number of calibration events without swamping an observed signal of interest.

In accordance with some embodiments the scintillator body is provided with a reflective surface.

In accordance with some embodiments the gating circuit comprises a signal amplifier and a signal discriminator.

According to another aspect of the invention there is provided an apparatus comprising a calibration source according to the first aspect of the invention and a gamma-ray spectrometer, wherein the gamma-ray spectrometer comprises a data acquisition circuit operable to processing a gamma-ray detection signal associated with a gamma-ray detection occurring within the time window defined by the gating signal, to calculate an energy for the detection event, to compare the calculated energy for the detection event with the known energy of gamma-rays from the radioactive material in the calibration source, and to determine a correction factor for the data acquisition circuit based on a difference between the calculated energy and the known energy.

According to another aspect of the invention there is provided a method of calibrating a gamma-ray spectrometer comprising: providing a calibration source comprising a scintillator body having a cavity in which a radioactive material is received, the radioactive material comprising a radioactive isotope having a decay transition associated with emission of a radiation particle and a gamma-ray having a known energy, and a photodetector optically coupled to the scintillator body; detecting, with the photodetector, scintillation photons associated with radiation particles emitted from the radioactive material within the cavity of the scintillator body interacting with the scintillator body; and generating a gating signal in response to the detection of the scintillation photons; and identifying a gamma-ray detection in the gamma-ray spectrometer occurring within a time window defined by the gating signal.

In accordance with some embodiments the method further comprises calculating an energy for the gamma-ray detection event identified as occurring within a time window defined by the gating signal by processing a detection signal associated with the gamma-ray detection in a data acquisition circuit of the gamma-ray spectrometer, comparing the calculated energy for the gamma-ray detection with the known energy of gamma-rays from the radioactive material in the calibration source, and determining a correction factor for the data acquisition circuit based on a difference between the calculated energy and the known energy.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
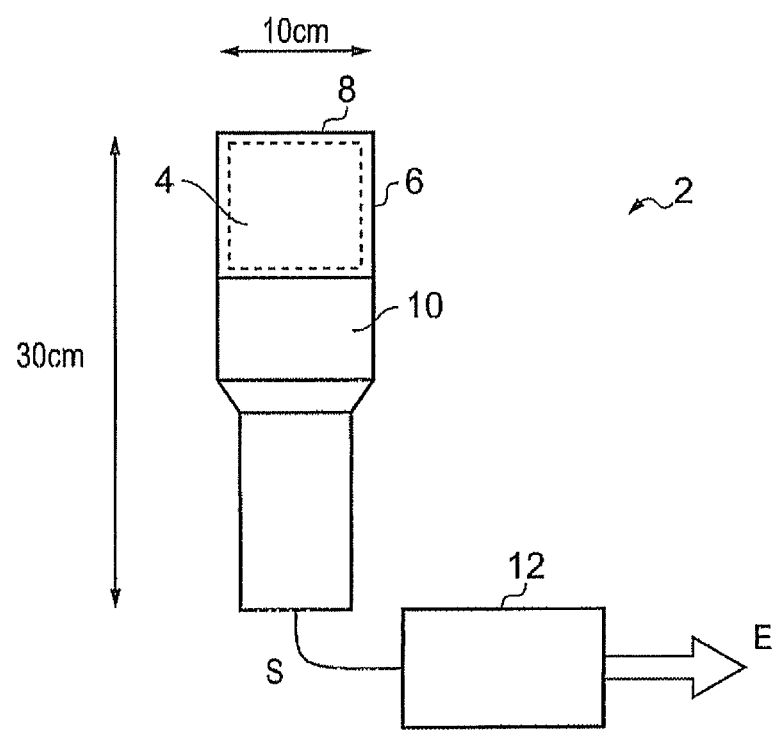
FIG. 1 schematically shows a conventional scintillator-based gamma-ray spectrometer.
Figure 2:
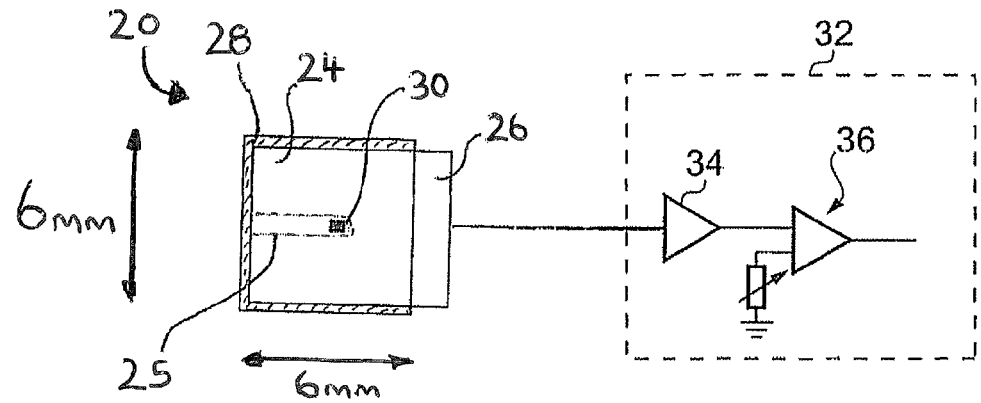
FIG. 2 schematically shows a section view of a calibration source according to an embodiment of the invention.

FIG. 2 schematically shows a calibration source 20 according to an embodiment of the invention. The calibration source 20 is based around a deposit of radioactive material 30 comprising a radioactive isotope having a decay transition associated with emission of a radiation particle and a gamma-ray. In this example, the radioactive material comprises a salt of Na-22. Na-22 is associated with a radioactive transition that results in emission of a beta-plus particle (positron) having a maximum energy of around 545 keV, and a gamma-ray having an energy around 1274 keV. Subsequent matter-anti-matter annihilation of the positron further results in the emission of a pair of 511 keV gamma-rays. In this example the radioactive material 30 has an activity of around 100 Bq. This will of course reduce with time, with Na-22 having a half-life of around 2.6 years.

The calibration source 20 comprises a scintillator body 24, which in this example is generally cuboid with an extent of around 6 mm per side. The scintillator body in this example comprises a conventional plastic scintillator material. However, the specific nature of the scintillator material is not very significant.

The scintillator body 24 is coupled to a photodetector 26, which in this example is a silicon photomultiplier detector, having a sensitive area broadly matched in size to one side of the scintillator body 24. As an example, a Hamamatsu or a SensL silicon photo-multiplier may be used. In other examples, other forms of photodetector could equally be used, for example another form of solid state detector, such as a PIN diode detector, or a conventional photomultiplier tube.

The scintillator body 24 has a cavity 25 formed therein and the radioactive material is located within this cavity 25. The cavity 25 in this example is formed by drilling into the scintillator body 24 to a sufficient depth that the radioactive material 30 may be located around the centre of the scintillator body 24. After introduction of the radioactive material 30 into the cavity 25, the cavity in this example is back-filled to contain the radioactive material in place. Backfilling may be performed using any suitable filler. For example by introducing an epoxy resin or melted plastic into the cavity and allowing it to harden. Alternatively, the cavity may be filled by plugging with a suitable sized plug. In principle, the cavity may be back-filled using the same material as the scintillator body or other scintillating material. For example, the cavity might comprise a drilled hole and may be backfilled by plugging with a scintillating optical fibre having a suitable diameter, such as around 1 mm. In general it may be preferable for the cavity to have a width closely matching that of the radioactive material to be introduced, thereby avoiding unnecessary interruption to the internal structure of the scintillator body. In general it may also be preferable for the cavity to reach a depth in the scintillator body such that radiation particles emitted by the radioactive source have a typical range which is less than the distance to the surface of the scintillator body. A cavity extending to the centre of the scintillator body and having a characteristic width or around 1 mm might be appropriate, for example.

In the example of FIG. 2 the photodetector is not on the same face of the scintillator body in which the cavity is formed. In other examples the photodetector may be sealed against a surface of the scintillator body in which the cavity is formed to provide additional sealing of the received radio material.

The scintillator body is further surrounded by an opaque housing 28 provided with a reflective surface adjacent the scintillator body 24. The reflective surface may be a diffuse reflective surface, for example provided by wrapping using a PTFE tape or painting with white reflecting paint. Although not shown in FIG. 2, the calibration source may further comprise external shielding to reduce the likelihood of radiation interactions within the scintillator body 24 coming from external sources.

The radioactive material 30 may be introduced into the cavity 25 in the scintillator body 24 in the form of a pellet or in liquid form, for example dissolved in a solvent. The size of the radioactive material may be relatively small, for example less than 1 mm in extent.

Thus, the scintillator body 24 generally surrounds the radioactive material 30 so that positrons emitted by the radioactive material 30 may interact with the scintillator body 24 to generate scintillation photons. The photodetector 26 is arranged to receive such scintillation photons so as to provide an output signal indicative of a detection event within the scintillator body 24.

The characteristic extent of the radioactive source material 30 is relatively small compared to the characteristic extent of the scintillator body 24 such that the scintillator body largely surrounds the radioactive material 30. Thus the scintillator body subtends a solid angle seen by the radioactive source which is approaching $4\pi$ steradians, e.g. in excess of 95% of a closed surface around the radioactive material.

A significant aspect of the design of the calibration source of FIG. 2 is simplicity of construction, and in particular the ability to introduce the radioactive material 30 after manufacture of the scintillator body 24. Furthermore, this can be done readily, for example by simple drilling of the scintillator body, insertion of the radioactive material, for example in the form of a dissolved radioactive salt, and closing of the cavity in which the radiator material is received. This means the final steps in constructing the calibration source can be completed easily, for example in a basic laboratory environment where radioactive materials can be handled with relatively tight controls for avoiding contamination and where the consequences of contamination are reduced as compared to in a manufacturing plant. Furthermore, the approach avoids the need for the manufacture of the scintillator body 24 to hold a licence for handling radioactive materials. The use of the solid-state photodetector further allows a calibration source having a relatively small size, for example having a main body on the order of 1 cm$^3$, or thereabouts.

Output signals from the silicon photomultiplier 26 are coupled to a gating circuit 32. The gating circuit comprises a signal amplifier 34 for amplifying signals from the silicon photomultiplier 26. The amplifier may be of any kind conventionally used with silicon photomultipliers. The output from the amplifier 34 is coupled to an input of a discriminator 36. The discriminator 36 may similarly be of any conventional kind and is configured to output a logic-level indication when the input to the discriminator 36 from the amplifier 34 exceeds a threshold level, e.g. a desired threshold voltage selected by adjusting a variable resistor associated with the discriminator 36.

Figure 3:
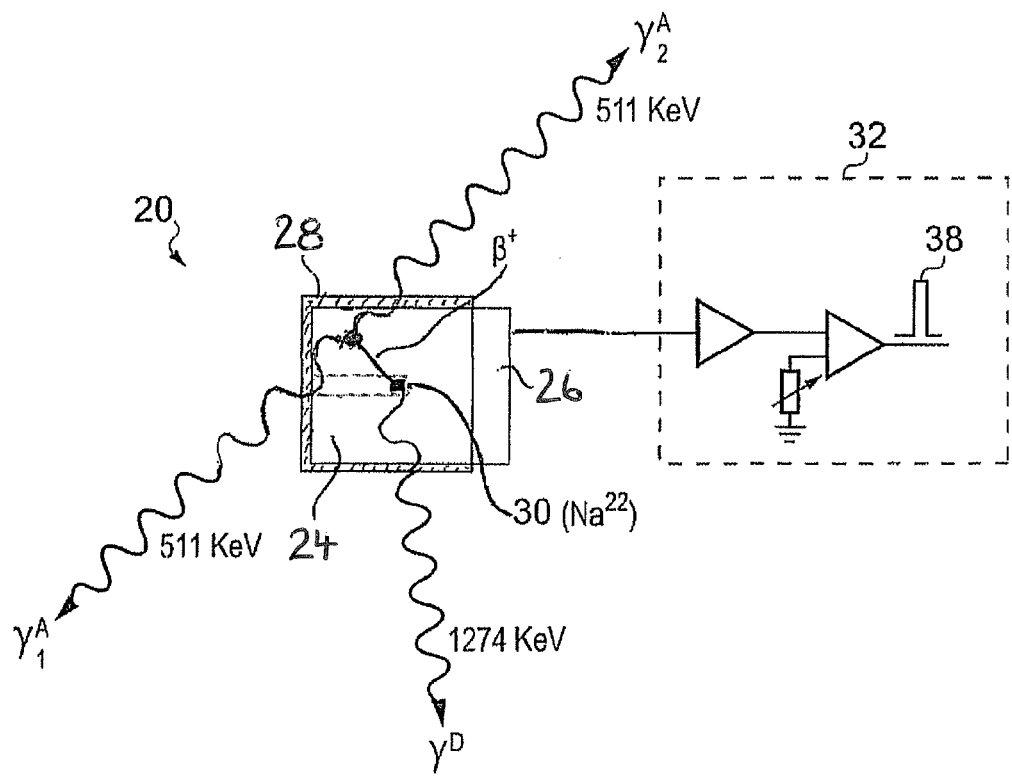
FIG. 3 schematically shows the calibration source shown in FIG. 2 during a calibration event.

FIG. 3 is similar to and will be understood from FIG. 2, but shows the calibration source 20 shown in FIG. 2 during a calibration event, i.e. a nuclear transition within the radioactive material 30. As noted above, Na-22 has a nuclear decay transition that is associated with emission of a 1274 keV gamma-ray ($\gamma^D$)) and a positron ($\beta^+$), which may subsequently annihilate to two 511 keV annihilation gamma-rays ($\gamma^A$), i.e.

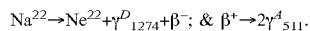

$$Na^{22} \rightarrow Ne^{22} + \gamma^D{}_{1274} + \beta^-;\ \&\ \beta^+ \rightarrow 2\gamma^A{}_{511}.$$

Thus, as schematically shown in FIG. 3, a Na-22 nucleus in the radioactive material 30 decays by emitting a 1274 keV gamma-ray $\gamma^D$ and a positron $\beta^+$. The decay gamma-ray $\gamma^D$ readily escapes the calibration source in an arbitrary direction. Positrons emitted from Na-22 typically have a relatively high kinetic energy, e.g. up to 545 keV. A positron $\beta^+$ will perhaps require around 40 keV in kinetic energy to escape from the radioactive material 30. This is a relatively small amount compared to the typical kinetic energy of a Na-22 positron. Thus the majority of positrons will readily escape from the radioactive material 30 (the positron cannot annihilate until it is approaching rest because of momentum consideration). The relatively-high-energy end-point of its $\beta^+$ spectrum is one advantage of using Na-22.

The positron $\beta^+$ also escapes the radioactive material 30 in an arbitrary direction. However, because the scintillator body 24 subtends a large solid angle about the radioactive material, the positron $\beta^+$ will, for the geometry shown in FIGS. 2 and 3, almost certainly enter the scintillator body 24 where scintillation photons may subsequently be generated in an interaction event as the positron interacts with the scintillation material comprising the scintillator body 24. In FIG. 3 the positron $\beta^+$ is schematically shown entering the scintillator body 24 towards the upper left in the orientation of the figure. The positron $\beta^+$ deposits kinetic energy and generates corresponding scintillation photons as it moves through the scintillator body 24 before approaching rest and annihilates with an electron in the scintillator body 24. This results in the emission of a pair of 511 keV annihilation gamma-rays $\gamma_1{}^A$, $\gamma_2{}^A$ as schematically shown in the figure. The annihilation gamma-rays $\gamma_1{}^A$, $\gamma_2{}^A$ are emitted in arbitrarily aligned opposite directions and readily escape the calibration source 20.

The kinetic energy of the positron $\beta^+$ lost in the scintillation body 24 generate scintillation photons which are detected by the photodetector 26 in accordance with generally standard techniques for detecting interaction events in the scintillator material. The photodetector 26 provides an output signal having a magnitude related to the number of scintillation photons detected, which in turn depends on the kinetic energy deposited in the scintillator body by the positron. The signal from the photodetector 26 is amplified by the amplifier 34 and passed on to the discriminator 36. If the amplified signal exceeds a detection threshold that has been set for the discriminator 36, the discriminator outputs a pulse 38. The pulse 38 may be referred to as a gating/trigger pulse G. The characteristics of the pulse, e.g. its amplitude, whether it is positive-going or negative-going, its duration, and so forth, may be configured in accordance with known techniques for generating trigger pulses, e.g. for (anti-)coincidence timing in radiation detectors generally. Here it will be assumed the gating pulse is positive-going with a 5 v logic-level amplitude and a duration of 1 µS.

The net result of this example radioactive decay event in the radioactive material is thus a gating pulse 38 from the gating circuit 32, and three gamma-rays, namely a 1274 keV Na-22 radioactive decay gamma-ray $\gamma^D$, and first $\gamma_1{}^A$ and second $\gamma_2{}^A$ positron-electron 511 keV annihilation gamma-rays. The inventors have found with the above-described calibration source that the rising edge of the gating pulse occurs about 0.2 µS or so after the nuclear decay event. Thus, the three gamma-rays are to all intents and purposes emitted simultaneously with the nuclear decay event.

Three gamma-rays and a gating signal can be expected for almost all of the Na-22 decays for the geometry shown in FIGS. 2 and 3. This is because almost all positrons will deposit energy in the scintillator body 24 (assuming an appropriately set trigger threshold for the discriminator 36). These cases may be referred to as "captured" or "tagged" calibration-source decay events. There may, however, still be a small number of radioactive decay events in the radioactive material 30 which do not result in a deposit of (sufficient) energy in the scintillator body 24 to generate a gating signal. This may be because the positron does not escape the radioactive material, or escapes in a direction associated with the cavity 25, for example to be stopped in an inert backfilling material. The net result of each Na-22 decay in these cases is the same three gamma-rays, but without any gating pulse. These cases may be referred to as "non-captured" or "untagged" calibration-source decay events.

The ratio of tagged events to untagged events (captured events to non-captured events) is primarily governed by the geometry of the detector assembly (i.e. the extent to which the scintillator body 24 surrounds the radioactive material 30), and the ease with which positrons can escape the radioactive material 30 and surrounding envelope. Generally speaking, the higher the ratio of tagged events to untagged events, the better the performance of the calibration source. For this reason, it may be advantageous to ensure the cavity 25 is as small as possible while still allowing the radioactive material 30 to be introduced into the desired location. Furthermore, in principle, the cavity may be back-filled with a scintillating material, for example corresponding to that of the scintillator body, once the radioactive material has been introduced to maximise the number of captured events.

Figure 4:
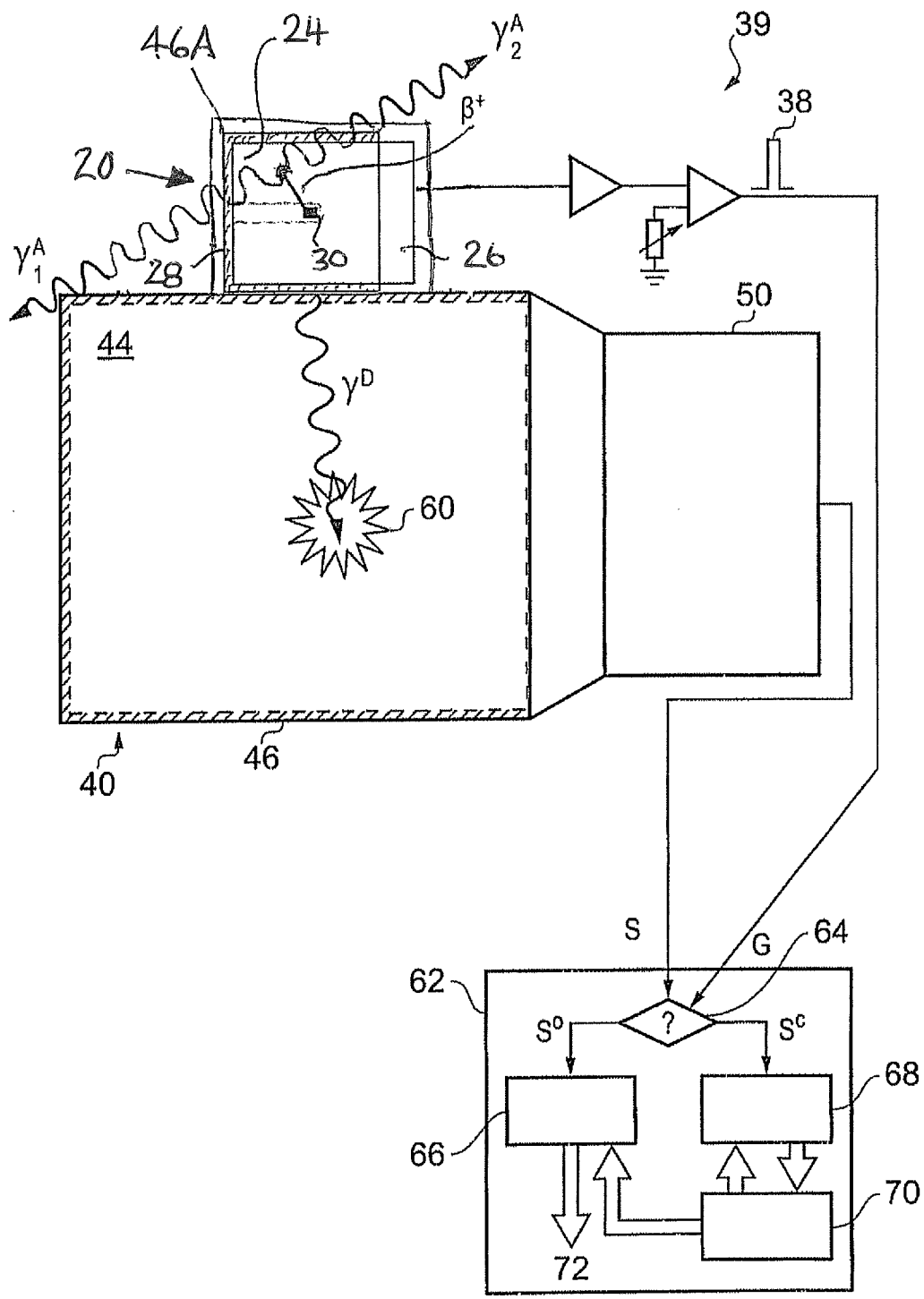
FIG. 4 schematically shows the calibration source shown in FIG. 2 in use with a gamma-ray spectrometer according to an embodiment of the invention.

FIG. 4 schematically shows an apparatus 39 comprising the calibration source 20 of FIGS. 2 and 3 and a broadly conventional gamma-ray spectrometer 40. The calibration source 20 and the gamma-ray spectrometer 40 are not shown to scale. (The main body of calibration source 20 comprising the scintillator body 24 will in general be relatively smaller than schematically shown in the figure). In this example the gamma-ray spectrometer 40 is a scintillator crystal-based gamma-ray spectrometer, but similar principles can be applied for response-stabilization of other gamma-ray spectrometers based on other technologies, e.g. based on hyperpure germanium detectors. The calibration source 20 and components of the gamma-ray spectrometer 40 are in this example contained within a common housing 46, e.g., an aluminium casing, so as to provide the self-contained apparatus comprising a combined calibration source and gamma-ray spectrometer. In the more general case, the calibration source and the spectrometer may be in separate housings. For example, the spectrometer may be of a conventional design within a conventional housing, and the calibration source may simply be attached or held against a side of the spectrometer housing.

The spectrometer component 40 of the apparatus 39 comprises a conventional scintillation crystal 44 which scintillates when a gamma-ray is absorbed within it. In this example, the scintillation crystal material is thallium doped sodium iodide (NaI(Tl)). Other scintillator crystals, or scintillator plastics, could equally be used.

The scintillation crystal 44 is optically coupled to a PMT 50 in any of the usual ways, e.g. directly or via an optical coupling element. In other examples, a solid state photodetector may replace the PMT 50. The scintillation crystal 40 is mounted in the housing 46. The housing has a region 46A for receiving the calibration source 20 in a position adjacent the scintillation crystal 44. The scintillation crystal 44 is packed in $Al_2O_3$ powder (schematically shown hatched in the figure) arranged to act as a reflective material, again in the usual way. As is conventional, gamma-rays interact with the scintillation crystal 44 in scintillation events in which lower-energy photons are generated, e.g. optical photons. The scintillation crystal 44 is optically coupled to the PMT 50. The PMT 50 is operable to output a signal indicative S of the intensity of the scintillation flash generated in the crystal 46 in response to each gamma-ray interaction. In this example, the output signal from the PMT is based on an integration time of around 1.5 μS, that is to say, the initial signal processing component of the PMT 50 (not shown in the figure) integrates the signal (current) seen at the anode of the PMT for around 1.5 μS to provide the output signal S. This integration time is based, for example, on the temporal response characteristics of the scintillation crystal 44 in the usual way.

FIG. 4 schematically shows the calibration source/gamma-ray spectrometer assembly 39 during a captured calibration-source decay event of the kind schematically shown in FIG. 3. As noted above, a captured calibration-source decay event is associated with a electronic gating signal G represented by a trigger pulse 38 and three (in effect) instantaneous gamma-ray emissions (one at 1274 keV and two at 511 keV). The gamma-rays are emitted in arbitrary directions (subject to the proviso that the two 511 keV annihilation gamma-rays are emitted in opposite directions). Thus there is a chance of one or more gamma-rays associated with a nuclear decay event in the radioactive material entering the scintillation crystal 46 and giving rise to a corresponding output signal S. In the example schematically shown in FIG. 4, the 1274 keV decay gamma-ray $\gamma^D$ is shown generating a scintillation event 60 in the scintillation crystal, while neither of the 511 keV annihilation gamma-rays $\gamma_1^A$, $\gamma_2^A$ enter the crystal. The gating pulse G from the gating circuit can thus be used as an indicator that a radioactive decay has occurred in the calibration source 20, and as such any gamma-ray energy deposit in the gamma-ray spectrometer 40 which occurs within a time window defined by the gating signal (e.g. simultaneously with) may be taken to be associated with the radioactive isotope. The time window may be configured having regard to the temporal characteristics of the of the gating signal and the spectrometer response in the usual way for (anti-)coincidence detection techniques. Thus in effect, the gating signal G may be used to tag gamma-ray detections occurring in the spectrometer 40 as being associated with a decay in the calibration source.

Thus the apparatus 39 further comprises a processor 62 arranged to receive gating signals G from the gating circuit of the calibration source and output signals S from the PMT 50 of the spectrometer 40. The processor 62 comprises a signal routing switch 64 for routing output signals S from the PMT 50 to one of two multi-channel analysers (MCA) 66, 68 in dependence on whether or not the output signals S occur in coincidence with a gating signal G. This is the output of primary interest. (It will be appreciated that the various functional blocks of the processor 62 of the apparatus 39 are shown separately in FIG. 4 primarily for ease of explanation. In some embodiments the functionality of these elements may, for example, be provided by a single hardware element, e.g. a suitably programmed processor of a general purpose computer.)

Output signals S that do not occur in coincidence with a gating signal G are routed to the first MCA 66. Since these output signals are not associated with a gating signal G, they are assumed to relate to radiation in the environment being observed by the gamma-ray spectrometer 40, for example, in an item of cargo at a port, and not calibration source decay events. Thus the output signals routed to the first MCA 66 correspond with the events of primary interest, and may be referred to as observed signal events $S^O$. The first MCA 66 is thus operable to generate an energy-loss spectrum 72 for the observed signal events $S^O$.

Output signals S that do occur in coincidence with a gating signal G are routed to the second MCA 68. Since these output signals are associated with a gating signal G, they are assumed to relate to an event in the calibration source. These events may be referred to as calibration signal events $S^C$.

The second MCA 68 is operable to generate an energy-loss spectrum for the calibration signal events $S^C$, for example in the usual way and in accordance with a nominally assumed calibration function for the spectrometer. However, significantly there are only a few possible energy depositions that can be associated with the calibration events, and furthermore these energies are known (or at least their respective maxima are known). For the geometry shown in FIG. 4, there are four possible energy depositions in the scintillation crystal 44. These are:

(i) 0 keV (none of the three gamma-rays interact with the scintillation crystal 44, i.e., they all "miss")—these events may be ignored;

(ii) 511 keV (one of the annihilation gamma-rays $\gamma_1^A$, $\gamma_2^A$ only interacts with the scintillation crystal);

(iii) 1274 keV (the decay gamma-ray $\gamma^D$ only interacts with the scintillation crystal—as shown in FIG. 4);

(iv) 1785 keV (one of the annihilation gamma-rays $\gamma_1^A$, $\gamma_2^A$ and the decay gamma-ray $\gamma^D$ interact with the scintillation crystal);

It may be noted for the geometry shown in FIG. 4 that it is not possible for both annihilation gamma-rays $\gamma_1^A$, $\gamma_2^A$ to interact with the scintillation crystal because they are oppositely directed. For other geometries (e.g. with a calibration source recessed within an opening in a scintillation crystal), both annihilation gamma-rays $\gamma_1^A$, $\gamma_2^A$ may deposit energy in the scintillation crystal at the same time. Thus there will be two further possible energy depositions in the scintillation crystal, namely:

(v) 1022 keV (both annihilation gamma-rays $\gamma_1^A$, $\gamma_2^A$ interacts with the scintillation crystal and the decay gamma-ray $\gamma^D$ does not); and (vi) 2296 keV (all three gamma-rays interact with the crystal).

However, for the geometry shown in FIG. 4 the second MCA 68 would generate a spectrum containing three peaks (corresponding to energy depositions of 511 keV, 1274 keV and 1785 keV). Spectra from the second MCA 68 are output to a stabilization controller 70. The stabilization controller 70 is operable to compare the locations of peaks (or edges in the event there are significant Compton scattering, such as in polyvinyl toluene (PVT), the scintillation body) in the spectrum of calibration signal events from the second MCA 68 with the known possible energy deposits for the calibration events. The stabilization controller 70 is further operable to determine from the comparison what correction factors (which may be energy dependent) are needed to align the calculated calibration event energies with their known values. in doing this the stabilization controller 70 may operate in accordance with the well-understood general principles for gain stabilization in gamma-ray spectrometers based on calibration spectra. Significantly, however, the processor 62 in accordance with embodiments of the invention is operable to modify the spectrometer response to apply corrections for gain stabilization in real time (depending on integration period for obtaining a calibration spectrum), and in parallel with obtaining a spectrum of observed signal events (i.e. the spectrum of interest). Furthermore, this is achieved with little contamination of the spectrum of observed signal events. The only contamination of the spectrum of interest comes from the non-captured calibration events. This is because these events may be associated with an energy deposit in the scintillation crystal which is not accompanied by a gating signal G. As such, output signals associated with these events may be routed by the switch 64 to the first MCA 66 responsible for processing the observed signal events.

Thus as schematically indicated in FIG. 4, the processor 62 is configured such that the stabilization controller 70 feeds calibration/stabilization information derived from the comparison of calculated calibration source event energies with their known energies back to the first and second MCAs 66, 68. Thus subsequent spectra are generated by the two MCAs in a manner that takes account of the correction factors determined by the stabilization controller 70. For example, if the stabilization controller were to determine that the energies calculated from the spectrum of calibration event signals were all too low by 10%, the two MCAs could be configured to "stretch" their spectra by 11% to compensate. This could be done numerically within the respective MCAs 66, 68 under feedback from the stabilization controller 70, or in hardware. For example, the gain of the PMT 50 could be varied, e.g. to increase output signals by 11% in response to a finding by the stabilization controller 70 that the energies calculated from the spectrum of calibration event signals were all too low by 10%.

It will be appreciated that the above-described example based on two MCAs is only one example of how the calibration signal events and the observed signal events may be separately handled. In practice there may only be one MCA that handles all signal events from the PMT, with the outputs from the MCA then classified as calibration signal events or observed signal events depending on whether or not there is a coincident gating signal. Outputs from the single MCA could then be routed to different memory elements for storage and subsequent spectrum generation accordingly. In another example, a single MCA may be operated in list mode to provide for each signal from the PMT an indication of signal strength and whether or not the event is associated with a coincident gating signal. This list output from the MCA could then be stored in memory and processed later. The later processing can then be responsible for classifying the events as calibration signal events and the observed signal events based on the gating signal indicator. As above, a spectrum of calibration signal events can then be used to stabilize/calibrate a spectrum of the observed signal events.

Thus in accordance with embodiments of the invention, a spectrum 72 of observed signal events (the signal of interest) may be automatically stabilized in parallel with the stabilization spectrum of the calibration signal events. The spectrum 72 may be processed, displayed, etc., in accordance with known techniques according to the implementation at hand. For example, the apparatus may be a hand-held radiation detector for scanning cargo/people at a port. On switch on, the spectrometer component 40 of the apparatus 39 may produce an output spectrum via the first MCA 66 for an integration time selected in the usual way, for example, an integration period of 10 seconds may be used based on expected count rate. For a 100 Bq strength radioactive material 30 in the calibration source 20, there will be around 1000 decay events in this period. With a >95% positron capture efficiency, there will be >950 calibration signal events. These may be used to produce a calibration spectrum via the second MCA 68. Comparison of calculated energies for features in the calibration spectrum (e.g. peaks or Compton edges) with their expected energies provides calibration information for the spectrometer. This may be applied to the output spectrum 72 obtained in the next 10 second integration period, or indeed applied to the output spectrum 72 obtained in the current 10 second integration period.

In other example, the MCAs may generate accumulation-type spectra as opposed to fixed integration-time spectra. Correction/stabilization factors to apply to the accumulating output spectrum 72 of observed signal events may be continuously applied according to the accumulating spectrum of calibration signal events.

It will be appreciated that other radioactive source materials which decay by simultaneously emitting a particle (not necessarily a positron) and a gamma-ray could also be used. For example Co-60 or Cs-137 could be used. An advantage of Na-22 is that it emits an anti-particle in its decay. This annihilates to generate two 511 keV gamma-rays which can also provide calibration information. Cs-137, for example, decays (via an intermediate state) by emitting an electron and a 662 keV gamma-ray. The electron can be detected in the solid state detector of a calibration source such as shown in FIG. 2 to provide a gating signal in the same way as described above for the positron in a Na-22 decay, but there will be no 511 keV annihilation gamma-rays. Thus only the 662 keV gamma-ray can be used for calibration purposes.

This provides a single-point calibration. However, in some cases a multi-point calibration (i.e. having multiple calibration energies) may be preferred to provide for energy-dependent stabilization, for example to calibrate scintillation detectors having a non-linear response or to compensate for any zero-offset in the MCA. In some examples a mixture of radioactive isotopes could be used in the radioactive material of the calibration source to provide an increased number of potential calibration points (i.e. an increased number of different possible energy depositions in the calibration event spectrum).

Thus as described above, a suitable radioactive source/material for use in a calibration source according to an embodiment of the invention, can be prepared by depositing, for example, an aqueous solution containing Co-60, Cs-137 or Na-22 salts into the cavity 25 of the scintillator body 24. After the solvent has evaporated, a weakly-radioactive gamma- and beta- ($\beta^-$ and/or $\beta^+$) source remains in the cavity in the scintillator body which can be sealed by backfilling/plugging the cavity 25, either completely, or partially. Radioactive particles emitted from the ready active material may then interact with the scintillator body to generate scintillation photons which are detected by a photodetector coupled thereto. Signals from the photodetector can be processed using conventional electronics to generate a gating signal indicating a gamma-ray has been emitted from the calibration source. This gating signal can be used to classify events detected in a nearby gamma-ray spectrometer into two groups containing (a) calibration events; or (b) non-calibration events (observed signal events). An example of how such a tagged gamma-ray source might be constructed, is illustrated in FIG. 2

Outputs from the photodetector of the calibration source in response to detection of a particle interaction in the scintillator body can be read-out using a single preamplifier shaping amplifier to provide a standard digital tagging signal. These few components can be combined into a single compact module that can be positioned close to the spectrometer to be calibrated. The spectrum of tagged events may be accumulated at a rate of around 100 events/s (i.e. for a 100 Bq source with high capture efficiency) to stabilize the gain of the instrument in event a rapidly changing environment.

Thus a calibration source for a gamma-ray spectrometer is provided. The calibration source comprises a scintillator body having a cavity in which a radioactive material is received. The scintillator body may be generally cuboid and the cavity may be formed by a hole drilled into the scintillator body. The radioactive material comprises a radioactive isotope having a decay transition associated with emission of a radiation particle and a gamma-ray having a known energy e.g. Na-22. A photodetector, for example a silicon photomultiplier, is optically coupled to the scintillator body and arranged to detect scintillation photons generated when radiation particles emitted from the radioactive material interact with the surrounding scintillator body. A gating circuit is arranged to receive detection signals from the photodetector and to generate corresponding gating signals for a data acquisition circuit of an associated gamma-ray spectrometer to indicate that gamma-ray detections in the gamma-ray spectrometer occurring within a time window defined by the gating signal are associated with a decay transition in the radioactive isotope. Thus a calibration source is provided based around a simple scintillator body design. Furthermore, the radioactive material may be introduced into the scintillator body in a separate step after manufacture of the scintillator body, thereby reducing the risk of radioactive contamination during manufacture.

REFERENCES

[1] Forrest, D., J., et al, *The gamma-ray spectrometer for the solar maximum mission*, Solar Physics 65, pp. 15-23, 1980
[2] Amcrys-H, 60 Lenin Ave, Kharkov 310001, Ukraine. See http://www.amcrys-h.com/Main Frame.htm
[3] Poulsen, J. M., et al, *IBIS calibration unit on INTEGRAL Satellite*, Proceedings 4$^{th}$ INTEGRAL workshop. ESA SP_459, September 2001
[4] WO 2010/034962 A2—Symetrica Limited

The invention claimed is:

1. A calibration source for a gamma-ray spectrometer, the calibration source comprising:
   a scintillator body having a cavity in which a radioactive material is received, the radioactive material comprising a radioactive isotope having a decay transition associated with emission of a radiation particle and a gamma-ray having a known energy;
   a photodetector optically coupled to the scintillator body and arranged to detect scintillation photons associated with radiation particles emitted from the radioactive material within the cavity of the scintillator body interacting with the scintillator body and to output corresponding detection signals; and
   a gating circuit arranged to receive the detection signals from the photodetector and to generate a corresponding gating signal and to output the gating signal for receipt by a data acquisition circuit of a gamma-ray spectrometer to indicate that gamma-ray detection in the gamma-ray spectrometer occurring within a time window defined by the gating signal is associated with a decay transition in the radioactive isotope.

2. A calibration source according to claim 1, wherein the photodetector is a solid-state detector.

3. A calibration source according to claim 2, wherein the photodetector is a silicon-based detector.

4. A calibration source according to claim 3, wherein the photodetector is a silicon photomultiplier.

5. A calibration source according to claim 3, wherein the photodetector is a P-Intrinsic-N (PIN) diode-based detector.

6. A calibration source according to claim 1, wherein the scintillator body comprises a plastic scintillator material.

7. A calibration source according to claim 1, wherein the radioactive material is located in the cavity in the vicinity of a centre of the scintillator body.

8. A calibration source according to claim 1, wherein the cavity extends inwardly from a surface of the scintillator body.

9. A calibration source according to claim 1, wherein the cavity is filled so as to contain the radioactive material.

10. A calibration source according to claim 1, wherein the gating circuit comprises a signal amplifier and a signal discriminator.

11. A calibration source according to claim 1, wherein the radioactive material is located in the cavity such that the surrounding scintillator body subtends a solid angle of at least a fraction selected from the group comprising 0.5, 0.6, 0.7, 0.8, 0.9 and 0.95 of a closed surface.

12. A calibration source according to claim 1, wherein the scintillator body has a similar characteristic extent in three orthogonal directions.

13. A calibration source according to claim 12, wherein the similar characteristic extent in three orthogonal directions is selected from the from the group comprising around 5 mm, 6 mm, 7 mm, 8 mm, 9 mm, 10 mm, 15 mm, 20 mm and 25 mm.

14. A calibration source according to claim 1, wherein the scintillator body is generally cuboid.

15. A calibration source according to claim 1, wherein the radiation particle is a beta particle.

16. A calibration source according to claim 1, wherein the radioactive isotope Na-22.

17. A calibration source according to claim 1, wherein the radioactive material has a radioactivity level in a range selected from the group comprising 10 Bq to 500 Bq, 50 Bq to 300 Bq, and 75 Bq to 150 Bq.

18. A calibration source, to claim 1, wherein the scintillator body is provided with a reflective surface.

19. Apparatus comprising a calibration source according to any previous claim and a gamma-ray spectrometer, wherein the gamma-ray spectrometer comprises a data acquisition circuit operable to processing a gamma-ray detection signal associated with a gamma-ray detection occurring within the time window defined by the gating signal, to calculate an energy for the detection event, to compare the calculated energy for the detection event with the known energy of gamma-rays from the radioactive material in the calibration source, and to determine a correction factor for the data acquisition circuit based on a difference between the calculated energy and the known energy.

20. A method of calibrating a gamma-ray spectrometer comprising:

providing a calibration source comprising a scintillator body having a cavity in which a radioactive material is received, the radioactive material comprising a radioactive isotope having a decay transition associated with emission of a radiation particle and a gamma-ray having a known energy, and a photodetector optically coupled to the scintillator body;

detecting, with the photodetector, scintillation photons associated with radiation particles emitted from the radioactive material within the cavity of the scintillator body interacting with the scintillator body; and generating a gating signal in response to the detection of the scintillation photons; and identifying a gamma-ray detection in the gamma-ray spectrometer occurring within a time window defined by the gating signal.

21. A method according to claim 20, further comprising calculating an energy for the gamma-ray detection event identified as occurring within a time window defined by the gating signal by processing a detection signal associated with the gamma-ray detection in a data acquisition circuit of the gamma-ray spectrometer, comparing the calculated energy for the gamma-ray detection with the known energy of gamma-rays from the radioactive material in the calibration source, and determining a correction factor for the data acquisition circuit based on a difference between the calculated energy and the known energy.

* * * * *